United States Patent
Devarayanigari et al.

(10) Patent No.: US 9,706,447 B2
(45) Date of Patent: Jul. 11, 2017

(54) METHOD AND APPARATUS FOR PROCESSING A CIRCUIT-SWITCHED (CS) CALL WHILE CAMPED ON A CSG CELL

(71) Applicant: Samsung Electronics Co., Ltd., Gyeonggi-do (KR)

(72) Inventors: Pavan Kumar Devarayanigari, Bangalore (IN); Prasad Basavaraj Dandra, Bangalore (IN); Vijay Ganesh Surisetty, Bangalore (IN); Nitesh Pushpak Shah, Bangalore (IN)

(73) Assignee: Samsung Electronics Co., Ltd (KR)

( * ) Notice: Subject to any disclaimer, the term of this patent is extended or adjusted under 35 U.S.C. 154(b) by 31 days.

(21) Appl. No.: 14/656,114

(22) Filed: Mar. 12, 2015

(65) Prior Publication Data

US 2015/0264604 A1 Sep. 17, 2015

(30) Foreign Application Priority Data

Mar. 12, 2014 (IN) .................... 1307/CHE/2014(PS)
Nov. 19, 2014 (IN) .................... 1307/CHE/2014(CS)

(51) Int. Cl.
  *H04W 36/00* (2009.01)
  *H04W 8/18* (2009.01)
  *H04W 48/18* (2009.01)

(52) U.S. Cl.
  CPC ....... *H04W 36/0022* (2013.01); *H04W 48/18* (2013.01); *H04W 8/186* (2013.01)

(58) Field of Classification Search
  None
  See application file for complete search history.

(56) References Cited

U.S. PATENT DOCUMENTS

| 8,619,733 B2 | 12/2013 | Subramanian et al. | |
| 2010/0110987 A1* | 5/2010 | Subramanian | H04W 48/18 370/328 |
| 2011/0064052 A1* | 3/2011 | Lee | H04W 36/0022 370/331 |
| 2013/0010696 A1* | 1/2013 | Mildh | H04W 76/02 370/328 |

* cited by examiner

*Primary Examiner* — Charles C Jiang
*Assistant Examiner* — Saad Khawar
(74) *Attorney, Agent, or Firm* — The Farrell Law Firm, P.C.

(57) ABSTRACT

A method and an apparatus are provided for processing a Circuit-Switched (CS) call by User Equipment (UE) that is camped on a CSG cell, when a manually selected CSG cell is in a Public Land Mobile Network (PLMN), which is different from a Registered PLMN (RPLMN). The method includes registering, by the UE, with a manually selected Closed Subscriber Group (CSG) cell of a Public Land Mobile Network (PLMN), which is different from a Registered PLMN (RPLMN) of the UE; detecting the CS call; and processing the CS call in a non-CSG cell, when the manually selected CSG cell is unable to process the CS call.

13 Claims, 7 Drawing Sheets

METHOD AND APPARATUS FOR PROCESSING A CIRCUIT-SWITCHED (CS) CALL WHILE CAMPED ON A CSG CELL

PRIORITY

This application claims priority under 35 U.S.C. §119(a) to Indian Provisional Application Number 1307/CHE/2014, which was filed in the Indian Intellectual Property Office on Mar. 12, 2014, and Indian Complete Application Number 1307/CHE/2014, filed on Nov. 19, 2014 in the Indian Intellectual Property Office, the disclosure of each of which is incorporated herein by reference.

BACKGROUND

1. Field of the Disclosure

The present disclosure relates to a method and apparatus for processing a Circuit-Switched (CS) call by a User Equipment (UE) that is camped on a manually selected Closed Subscriber Group (CSG) cell.

2. Description of the Related Art

The Third (3$^{rd}$) Generation Partnership Project (3GPP) defines a Closed Subscriber Group (CSG), which identifies subscribers of a service provider that are permitted to access a cell of a Public Land Mobile Network (PLMN), but which may have restricted access. More specifically, a CSG cell is accessible by members of the CSG, using a CSG Identity (CSG ID).

In a manual mode of CSG selection, a user of the UE selects a CSG cell. Specifically, the UE scans for available CSG cells, from which the user manually selects a CSG cell. The UE behavior may be differentiated based on whether the selected CSG cell belongs to a Registered PLMN (RPLMN) or to a different PLMN.

If the PLMN of the selected CSG cell is different than the RPLMN, then the UE saves the "current PLMN selection mode" and a duplicate value of the RPLMN into a non-volatile memory. Further, upon successful registration on the selected CSG cell, the RPLMN is not updated with that of the selected PLMN.

For example, when the UE is camped on the selected CSG cell, which belongs to a PLMN that is different than the RPLMN, and a CS call is initiated by a user the UE, the UE sends an Extended Service Request (ESR) to the PLMN of the manually selected CSG cell. However, because the manually selected PLMN is different from the RPLMN, the PLMN of the manually selected CSG cell may send a Redirection Request to the UE. The Redirection Request requests the UE to camp on a 3G/2G cell associated with the PLMN of the manually selected CSG cell or another PLMN in the network.

Based on the redirection request, the UE moves out of the currently camped CSG cell and initiates a cell search procedure for the 3G/2G cell on the PLMN associated with the manually selected CSG cell or the another PLMN in the network.

In current systems, when the UE moves out of manually camped CSG Cell (or when the UE loses the coverage of the user selected CSG cell), the UE changes the PLMN selection mode back to the PLMN selection mode saved prior to the manual CSG selection, and attempts recovery with the saved duplicate value of RPLMN. Hence, the CS call initiated by the user may not be processed by the UE, when the UE attempts recovery with the saved duplicate value of RPLMN (e.g., when UE moves out of currently camped CSG cell).

If the CS call is processed at the UE by camping on the 3G/2G cell of the same PLMN or a different PLMN, the UE returns to the stored duplicate value of the RPLMN, upon the termination of the CS call.

In the current systems, after the processing of the CS call, the user may have to manually select the CSG cell in order to camp on and re-register with the previously selected CSG cell. Accordingly, there is need for an easier method to camp on and re-register with the manually selected CSG cell.

SUMMARY

Accordingly, the present disclosure has been made to address at least the problems and/or disadvantages described above and to provide at least the advantages described below.

An aspect of the present disclosure is to provide a method and system for processing a CS call by a UE that is camped on a manually selected CSG cell.

Another aspect of the present disclosure is to provide a method and system for camping on and registering with a manually selected CSG cell, after processing a CS call by the UE.

In accordance with an aspect of the present disclosure, a method is provided for processing a CS call by a UE. The method includes registering, by the UE, with a manually selected Closed Subscriber Group (CSG) cell of a Public Land Mobile Network (PLMN), which is different from a Registered PLMN (RPLMN) of the UE; detecting the CS call; and processing the CS call in a non-CSG cell, when the manually selected CSG cell is unable to process the CS call.

In accordance with another aspect of the present disclosure, a UE is provided for processing a CS call. The UE includes a memory; and a controller configured to register the UE with a manually selected Closed Subscriber Group (CSG) cell of a Public Land Mobile Network (PLMN), which is different from a Registered PLMN (RPLMN) of the UE; detect the CS call; and process the CS call in a non-CSG cell, when the manually selected CSG cell is unable to process the CS call.

BRIEF DESCRIPTION OF THE DRAWINGS

The other aspects, features, and advantages of certain embodiments of the present disclosure will be more apparent from the following detailed description taken in conjunction with the accompanying drawings, in which.

DETAILED DESCRIPTION OF THE EMBODIMENTS

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The description may refer to "an", "one" or "some" embodiment(s) in several locations, which does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

The embodiments herein provide a method and an apparatus for processing a CS call by a UE that is camped on a manually selected CSG cell. The method includes detecting the CS call, when the UE is registered with the manually selected CSG cell. The manually selected CSG cell is in a PLMN different from an RPLMN. The CS call can be either a Mobile Originated (MO) call or a Mobile Terminated (MT) call.

When the UE detects the CS call, the UE sends an Extended Service Request (ESR) to the manually selected CSG cell. The UE receives a redirect request message from the manually selected CSG cell in response to the ESR. The redirect message indicates the UE to camp on a 3G/2G belonging to the PLMN of the manually selected CSG cell or a different PLMN by initiating a Circuit Switched Fall Back (CSFB) procedure. The non-CSG cell supports one or more services including, but not limited to, a Global System for Mobile communications (GSM) Edge Radio Access Network (GERAN) and Universal Mobile Telecommunications System (UMTS) Terrestrial Radio Access Network (UTRAN). The UE camps on the non-CSG cell of the PLMN of the manually selected CSG cell or a different PLMN for processing the CS call. For example, the non-CSG cell can be a macro cell.

When the CS call is processed or the CS call is ended by the UE, the UE initiates a search to identify the manually selected CSG cell using pre-stored parameters. For example, the pre-stored parameters include an Evolved UTRA (EUTRA) Absolute Radio Frequency Channel Number (EARFCN), a CSG Identifier (ID), a cell ID, etc. If the UE identifies the manually selected CSG cell, as a result of the search, then the UE camps on and registers with the manually selected CSG cell. When the manually selected CSG cell is unavailable, as a result of the search, then the UE camps on and registers with the RPLMN using a stored duplicate value of the RPLMN.

Unlike the conventional system, a proposed method and apparatus herein process the CS call, while the UE is camped on the CSG cell selected by the user. The CS call (including an Emergency call) is processed by the UE in the non-CSG cell by initiating the CSFB procedure, as opposed to the conventional system, where the CS call is dropped at the UE (e.g., upon the loss of coverage of the manually selected CSG cell).

When the CS call is processed, the UE camps on and registers with the manually selected CSG cell, instead of camping on the RPLMN. When the manually selected CSG cell is unavailable to the UE, the UE camps on and registers with the RPLMN using the stored duplicate value of the RPLMN.

Figure 1:
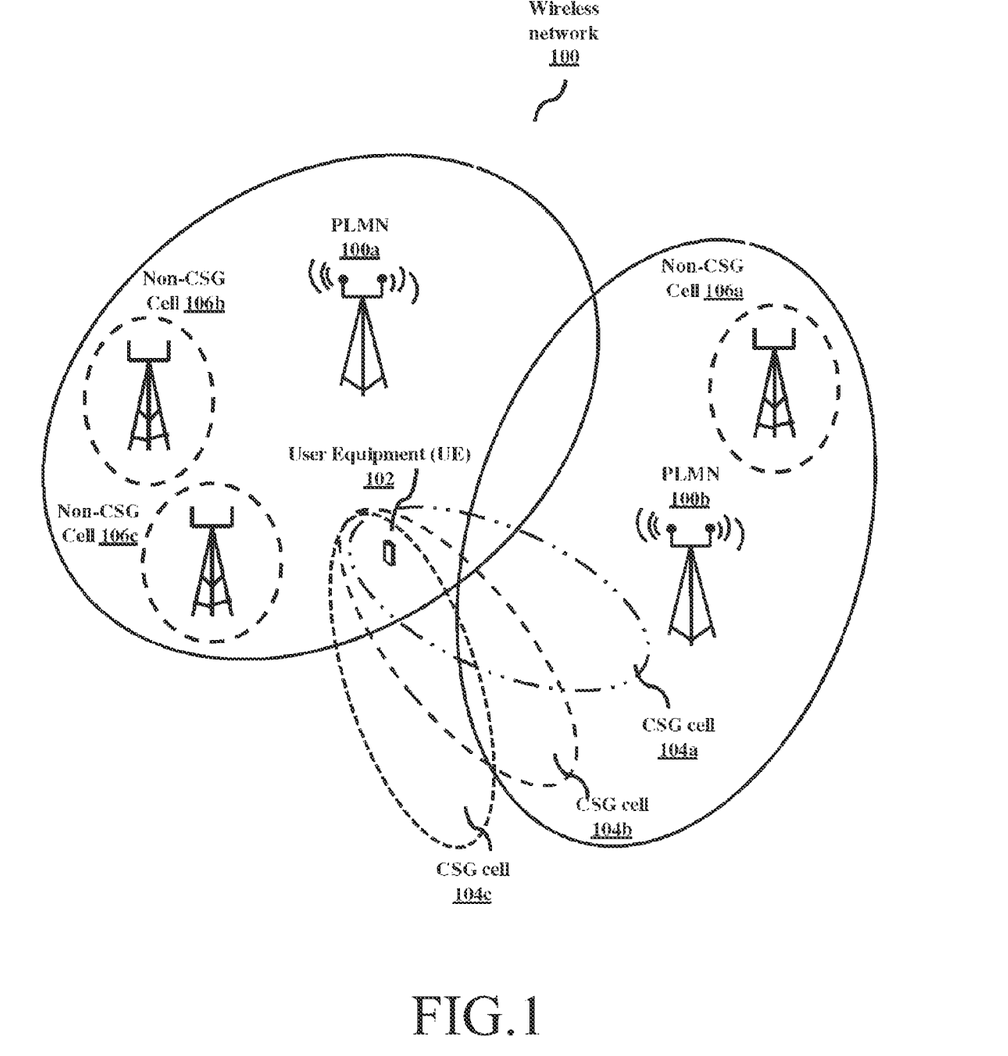
FIG. 1 illustrates a wireless network in which a UE processes a CS call while being camped on a manually selected CSG cell, according to an embodiment of the present disclosure.

FIG. 1 illustrates a wireless network in which a UE processes a CS call while being camped on a manually selected CSG cell, according to an embodiment of the present disclosure.

Referring to FIG. 1, the wireless network 100 includes a PLMN 100a, a PLMN 100b, a UE 102, a CSG 104a, a CSG 104b, and a CSG 104c, which are associated with the PLMN 100b, and a plurality of non-CSG cells 106a, 106b, and 106c. The non-CSG cell 106a is associated with the PLMN 100b and the non-CSG cells 106b and 106c are associated with the PLMN 100a.

For example, the UE 102 may be a cell phone, a personal digital assistant (PDA), a mobile personal computer, a laptop, a tablet, a phablet, a desktop computer, a communicator, etc.

The UE 102 can be registered with the PLMN 100a. Further, the PLMN 100a serving the UE 102 is commonly known as a Registered PLMN (RPLMN). Examples of services provided to the UE 102 by the RPLMN may include but are not limited to GERA (2G) services, UTRA (3G) services, and EUTRA (4G) services.

The CSG cells 104a, 104b, and 104c may further provide the UTRA (3G) services and EUTRA (LTE or 4G) services, as allowed by the network operator, i.e., PLMN 100b. When the UE 102 is registered with the PLMN 100a, and if the UE 102 enters an overlapping coverage area of CSG cells 104a, 104b, and 104c, the user can select any of the available CSG cells 104a, 104b, and 104c by initiating a manual CSG selection request.

During the manual CSG selection, the UE 102 scans all of the available CSG cells within its coverage area and provides a list of CSG cells to the user. For example, the list includes a plurality of detected CSG cells and the services (3G and 4G) supported by the detected CSG cells. The user can select any of the detected CSG cells from the CSG list. The UE 102 reselects the user selected CSG cell, after the user selected CSG cell accepts an attach request sent by the UE 102. The UE 102 registers with the CSG cell for obtaining the services from the CSG cell belonging to the PLMN 100b, which is different from the RPLMN, i.e., PLMN 100a.

For example, when the UE 102 is registered with the CSG cell 104a, if a user initiates a CS call (MO call), then the UE 102 sends the ESR to the manually selected CSG cell 104a.

In response to the ESR, the UE 102 receives the redirect request message from the manually selected CSG cell 104a. The redirect request message from the CSG cell 104a requests the UE 102 to initiate a CSFB procedure in the PLMN 100b or in the PLMN 100a for processing the CS call. The non-CSG cell 106a supports a plurality of services including, but not limited to, the GERA (2G) and the UTRA (3G) services.

For the MT call, the UE 102 receives a paging message indicating the CS call from the manually selected CSG cell 104a, before sending the ESR to the manually selected CSG cell 104a.

The UE 102 selects a non-CSG cell (either a 2G cell or a 3G cell) in the PLMN 100b or PLMN 100a for processing the CS call. For example, the UE 102 selects the non-CSG cell 106a, e.g., a macro cell, in the PLMN 100b for processing the CS call.

When the CS call is ended, the UE 102 initiates the search for identifying the manually selected CSG cell 104a. In an embodiment, the UE 102 initiates the search for the manually selected CSG cell 104a using pre-stored parameters such as the EARFCN, the CSG ID, and/or the cell ID. If the UE 102 determines that the CSG cell 104a is available, as a result of the search, then the UE 102 camps on and registers with the manually selected CSG cell 104a.

If the UE 102 determines that the manually selected CSG cell 104a is unavailable, as a result of the search, then the UE 102 camps on and registers with the PLMN 100a, which is the RPLMN of the UE 102. Specifically, the UE 102 camps on and registers with the PLMN 100a using the stored duplicate value of the RPLMN (i.e., PLMN 100a).

When the CS call is ended, the UE 102 camps on and registers with the manually selected CSG cell 104a using the pre-stored parameters of the manually selected CSG cell 104a, without moving to the RPLMN using the stored duplicate value of the RPLMN.

Figure 2:
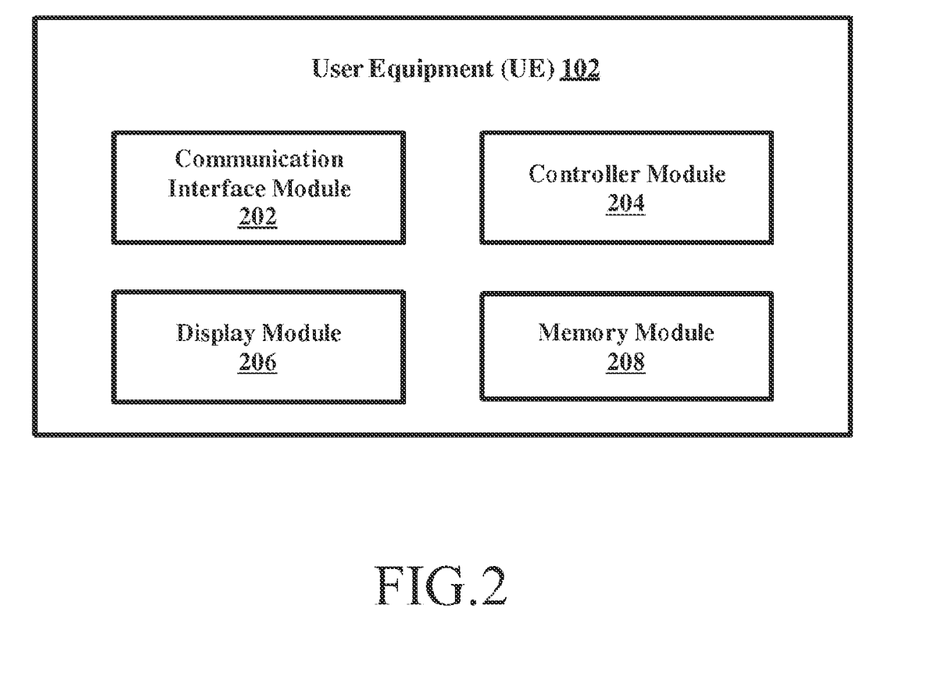
FIG. 2 is a block diagram illustrating a UE, according to an embodiment of the present disclosure.

FIG. 2 is a block diagram illustrating a UE, according to an embodiment of the present disclosure.

Referring to FIG. 2, the UE 102 includes a communication interface module 202, a controller module 204, a display module 206, and a memory module 208.

The communication interface module 202 is configured to connect the UE 102 to a wireless network.

The controller module 204 is configured to facilitate access control in the UE 102. For example, during a manual CSG selection mode, the controller module 204 is configured to obtain a CSG list by scanning the available CSG cells within the coverage area of the UE 102. The controller module 204 is configured to perform one or more actions for processing the CS call, when the UE 102 is registered with the CSG cell 104a on the PLMN 100b.

The display module 203 is configured to display a CSG list to the user. The CSG list includes a plurality of available CSG cells and services supported by the available CSG cells. For example, the user may select the CSG cell 104a from the CSG list, which can be displayed as a User Interface (UI) through the display module 206.

The display module 206 of the UE 102 may include the UI, e.g., a touch screen keypad through which the user can interact with the UE 102. Accordingly, the display module 206 may be configured to receive a user input selecting a CSG cell from the CSG list.

The memory module 208 may be a non-volatile memory or another type of dynamic storage device that stores information and instructions, e.g., an application for execution by a processor, a read-only memory (ROM) device, or another type of static storage device.

In an embodiment, the memory module 208 is configured to store one or more parameters associated with the manually selected CSG cell, such as but not limited to the EARFCN, the CSG ID, and/or the cell ID.

In an embodiment, the memory module 208 is configured to store the duplicate value of the RPLMN, which is used for connecting to the RPLMN, when the manually selected CSG cell is unavailable.

Figure 3:
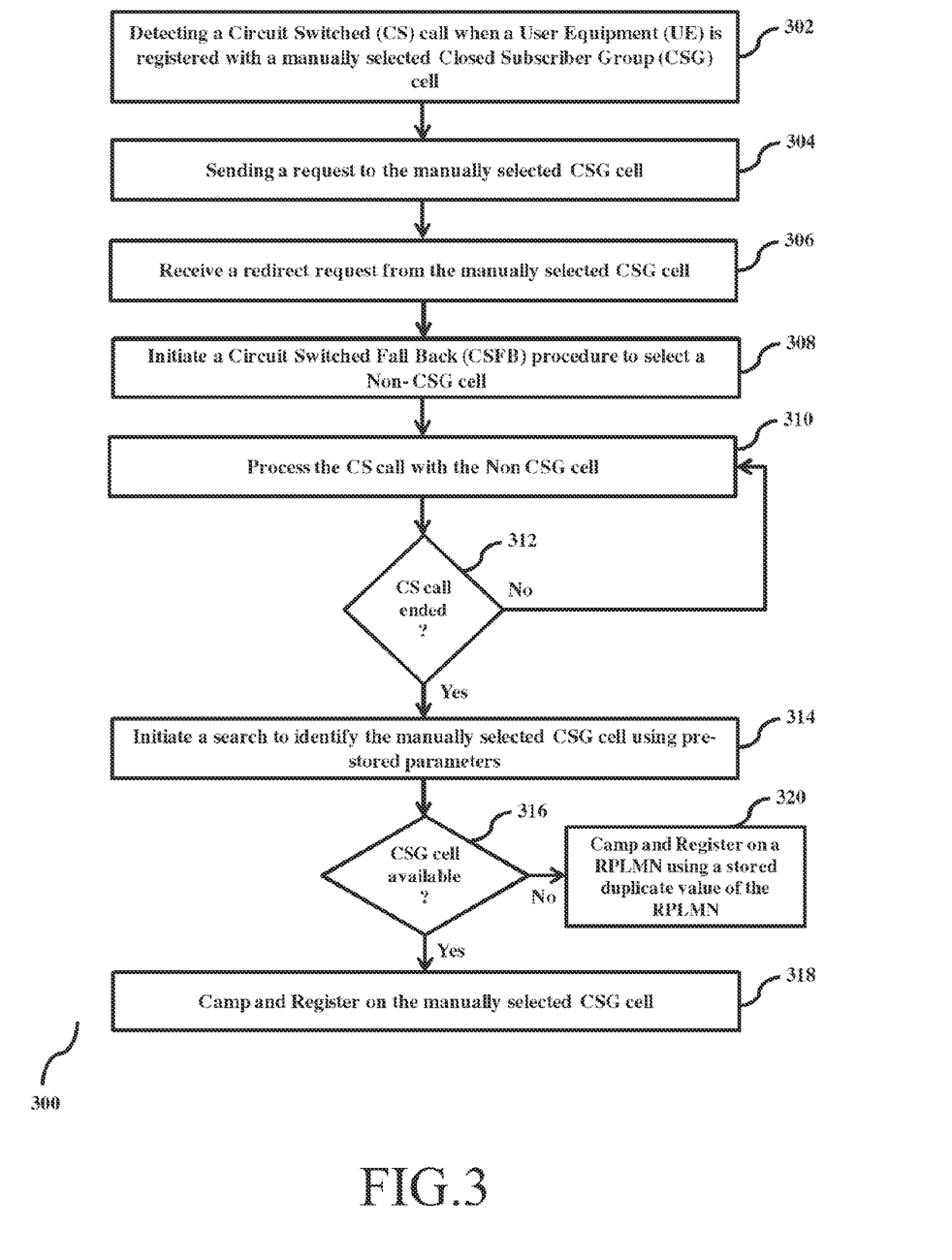
FIG. 3 is a flow diagram illustrating a method for processing a CS call by a UE that is camped on a manually selected CSG cell, according to an embodiment of the present disclosure.

FIG. 3 is a flow diagram illustrating a method 300 for processing a CS call by a UE that is camped on a CSG cell, according to an embodiment of the present disclosure. Specifically, the method illustrated in FIG. 3 provides a basis for a control program, which can be implemented using a microcontroller, microprocessor, or any computer readable storage medium. Referring to FIG. 3, assuming the UE 102 is registered with the PLMN 100a (i.e., the RPLMN), when the UE 102 enters the coverage area of CSG cells 104a, 104b and 104c, a user of the UE 102 can select any of the available CSG cells 104a, 104b, and 104c, by initiating a manual CSG selection request. The UE 102 reselects to the user selected CSG cell, e.g., CSG cell 104a, when the user selected CSG cell 104a accepts an attach request sent by the UE 102. The UE 102 registers with the CSG cell 104a for obtaining the services from the CSG cell 104a of the PLMN 100b, different from the RPLMN 100a. The method 300 for processing the CS call when the UE is registered with the manually selected CSG cell 104a is as described herein.

In step 302, the method 300 includes detecting the CS call when the UE 102 is registered with the manually selected CSG cell 104a of a different PLMN 100b. The method 300 allows, e.g., the controller module 204, detects a CS call while the UE is registered with the manually selected CSG cell 104a. For example, the CS call can be either the MO call or the MT call.

In step 304, the method 300 includes sending a request to the manually selected CSG cell. The method 300 allows the controller module 204 to the UE 102 sends the request to the manually selected CSG cell 104a. For example, the controller module 204 of the UE 102 sends an ESR to the manually selected CSG cell 104a.

In step 306, the method 300 includes receiving the redirect request from the manually selected CSG cell 104a. The method 300 allows the controller module 204 of the UE to 102 receive a redirect request from the manually selected CSG cell 104a. The redirect request requests the UE 102 to camp on either a 3G cell or the 2G cell belonging to the PLMN 100b, a different PLMN, or the RPLMN.

In step 308, the method 300 includes initiating the CSFB procedure to select the non-CSG cell. The method 300 allows the controller module 204 to the UE 102 initiates a CSFB procedure to select a non-CSG cell. Specifically, the controller module 204 of the UE 102 switches from the manually selected CSG cell 104a to a non-CSG cell, e.g., a macro cell, belonging to PLMN 100b or a different PLMN. In an example, the non-CSG cell can be a macro cell.

In step 310, the method 300 includes processing the CS call with the non-CSG cell. The method 300 allows the controller module 204 to UE 102 processes the CS call with the non-CSG cell. For example, the CS call can be processed at non-CSG cell 106a of PLMN 100b. As another example, the CS call can be processed at non-CSG cell 106b or 106c of the PLMN 100a (i.e., the RPLMN).

In step 312, the UE 102 determines whether the CS call is ended. For example, the controller module 204 of the UE 102 determines whether the user has ended the CS call.

If the CS call is ended, the UE 102 initiates a search to identify the manually selected CSG cell using pre-stored parameters in step 314. Specifically, the controller module 204 of the UE 102 initiates the search to identify the manually selected CSG cell 104a using pre-stored parameters, e.g., the EARFCN, the CSG ID, and the cell ID.

When the CS call is not ended, for the UE 102 continues processing the CS call with the non-CSG cell in step 310.

In step 316, the UE 102 determines whether the manually selected CSG cell 104a is available.

If the manually selected CSG cell 104a is available, the UE 102 camps on and registers with the manually selected CSG cell 104a in step 318. The method 300 allows the controller module 204 to camp and register on the manually selected CSG cell 104a. However, if the manually selected CSG cell 104a is unavailable, the UE 102 camps on and registers with the PLMN 100a (i.e., the RPLMN) using a stored duplicate value of the RPLMN. For example, the manually selected CSG cell 104a may be unavailable for the UE 102 when the UE 102 moves out of the coverage area of the manually selected CSG cell 104a.

The various steps illustrated in FIG. 3 may be performed in the order presented, in a different order, simultaneously, or a combination thereof. Further, in some embodiments, some of the steps illustrated in the FIG. 3 may be omitted.

Figure 4A:
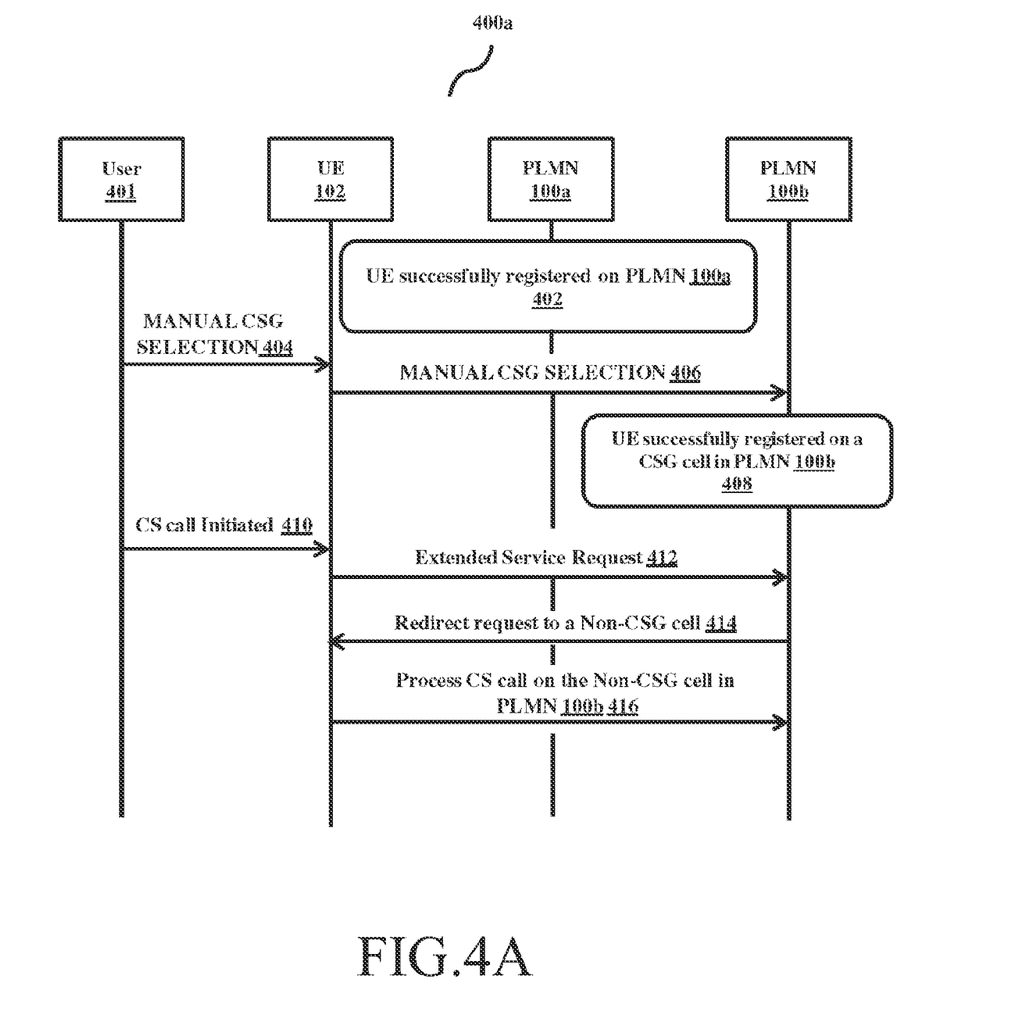
FIG. 4A is a signal flow diagram illustrating message signaling between a UE and PLMNs for processing a Mobile Originated (MO) CS call, while the UE is camped on a manually selected CSG cell, according to an embodiment of the present disclosure.

FIG. 4A is a signal flow 400a diagram illustrating message signaling between a UE and PLMNs for processing an MO CS call while the UE is camped on a manually selected CSG cell, according to an embodiment of the present disclosure. Referring to FIG. 4A, in step 402, the UE 102 registers with the PLMN 100a (i.e., the RPLMN).

In step 404, the user 401 initiates a manual CSG selection on the PLMN 100b, which is different from the RPLMN.

In step 406, the UE 102 sends a manual CSG selection request to the PLMN 100b. Although not illustrated, in response to the manual CSG selection request from the UE 102, the PLMN 100b sends the list of available CSG cells 104a, 104b, and 104c to the UE 102, which displays the list of available CSG cells to the user 401. Thereafter, the user 401 selects a CSG cell from the list of available CSG cells.

For example, in step 408, when the user selects the CSG cell 104a, the UE 102 registers with the user selected CSG cell 104a of the PLMN 100b, which is different from the RPLMN, i.e., PLMN 100a.

In step 410, the user 401 initiates a CS call on the UE 102.

In step 412, the UE 102 detects the CS call initiated by the user 401 and sends an ESR to the manually selected CSG cell 104a.

In step 414, in response to the ESR from the UE 102, the manually selected CSG cell 104a of the PLMN 100b sends a redirect message to the UE 102. The redirect message indicates that the UE 102 is to initiate a CSFB procedure in order to select a 3G/2G cell belonging to either the PLMN 100b or a different PLMN. For example, the UE 102 selects the non-CSG cell 106a, e.g., a macro cell, on the PLMN 100b, supports one or more services, e.g., GERA (2G) and UTRA (3G) services.

In step 416, the UE 102 processes the initiated CS call by selecting the non-CSG cell 106a on the PLMN 100b.

Figure 4B:
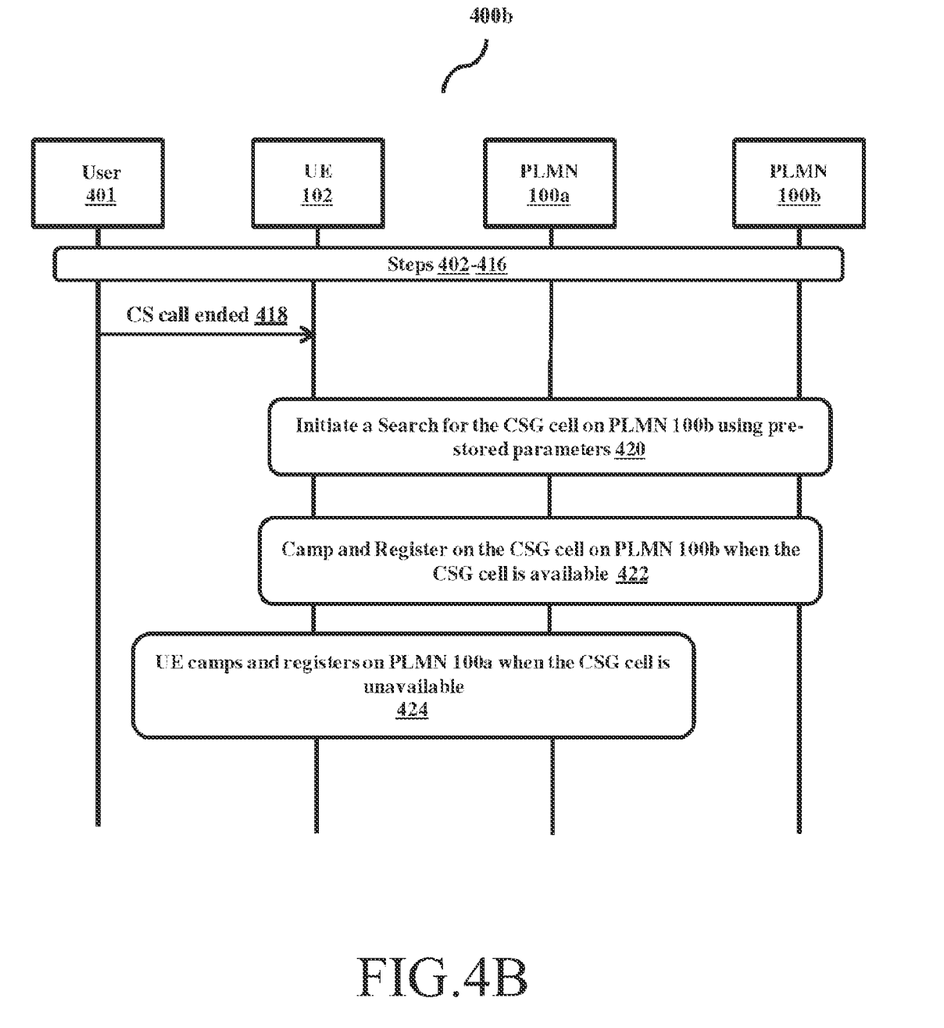
FIG. 4B is a signal flow diagram illustrating message signaling between a UE and PLMNs for camping on and registering with a manually selected CSG cell, after processing an MO CS call, according to an embodiment of the present disclosure.

FIG. 4B is a signal flow 400b diagram illustrating message signaling between a UE and PLMNs for camping on and registering with a manually selected CSG cell, after processing an MO CS, according to an embodiment of the present disclosure.

Referring to FIG. B, the initiated CS call is processed by the UE 102 on the non-CSG cell belonging to the PLMN 100b or different PLMN through steps 402-416, as illustrated in FIG. 4A.

When the initiated CS call is processed by the UE 102 or the initiated CS call is ended by the user 401 in step 418, the UE 102 initiates a search for the manually selected CSG cell 104a on the PLMN 100b using the pre-stored parameters in step 420. For example, the pre-stored parameters may include the EARFCN, the CSG ID, and the cell ID of the manually selected CSG cell 104a.

The UE 102 determines whether the manually selected CSG cell is available as a result of the search using the pre-stored parameters.

If the manually selected CSG cell 104a is available, the UE 102 camps on and registers with the manually selected CSG cell 104a on PLMN 100b in step 422. However, if the UE 102 determines that the manually selected CSG cell 104a is unavailable as a result of the search, then the UE 102 camps on and registers with the PLMN 100a (i.e., the RPLMN) using a stored duplicate value of the PLMN 100a in step 424.

Figure 5A:
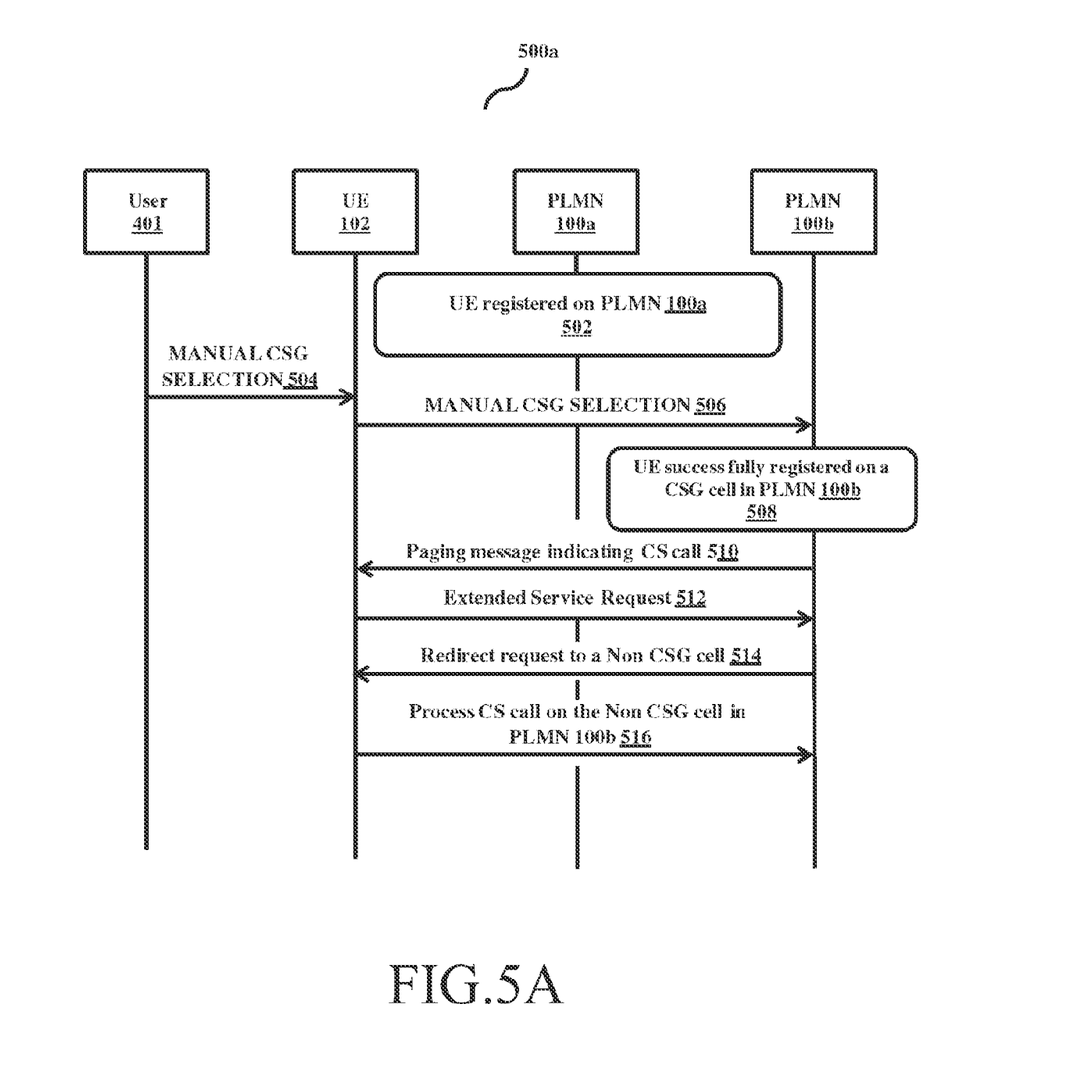
FIG. 5A is a signal flow diagram illustrating message signaling between a UE and PLMNs for processing a Mobile Terminated (MT) CS call, while the UE is camped on a CSG cell, according to an embodiment of the present disclosure.

FIG. 5A is a signal flow 500a diagram illustrating message signaling between a UE and PLMNs for processing an MT CS call by a UE that is camped on a CSG cell, according to an embodiment of the present disclosure.

Referring to FIG. 5A, the UE 102 registers on the PLMN 100a (i.e., the RPLMN) in step 502.

In step 504, the user 401 initiates a manual CSG selection on the PLMN 100b, which is different from the RPLMN.

In step 506, the UE 102 sends a manual CSG selection request to the PLMN 100b. Although not illustrated, in response to the manual CSG selection request from the UE 102, the PLMN 100b sends a list of available CSG cells 104a, 104b, and 104c to the UE 102, which displays the list of the available CSG cells to the user 401. Thereafter, the user selects one of the CSG cells from the list of the available CSG cells.

For example, when the user selects the CSG cell 104a, the UE 102 registers with the user selected CSG cell 104a on the PLMN 100b in step 508.

When an incoming CS call (an MT call) is made to the UE 102, in step 510, the UE 102 receives a paging message from the manually selected CSG cell 104a, indicating the incoming CS call.

In step 512, the UE 102 sends an ESR to the manually selected CSG cell 104a. In response to the ESR from the UE 102, the manually selected CSG cell 104a sends a redirect message to the UE 102 in step 514. The redirect message indicates that the UE 102 is to initiate a CSFB procedure in order to select a 3G/2G cell belonging to the PLMN 100b or a different PLMN.

For example, when the UE 102 selects the non-CSG cell 106a, e.g., a macro cell, of the PLMN 100b, which supports one or more services, e.g., the GERA (2G) and the UTRA (3G) services, the UE 102 processes the initiated CS call by selecting the non-CSG cell 106a of the PLMN 100b in step 516.

Figure 5B:
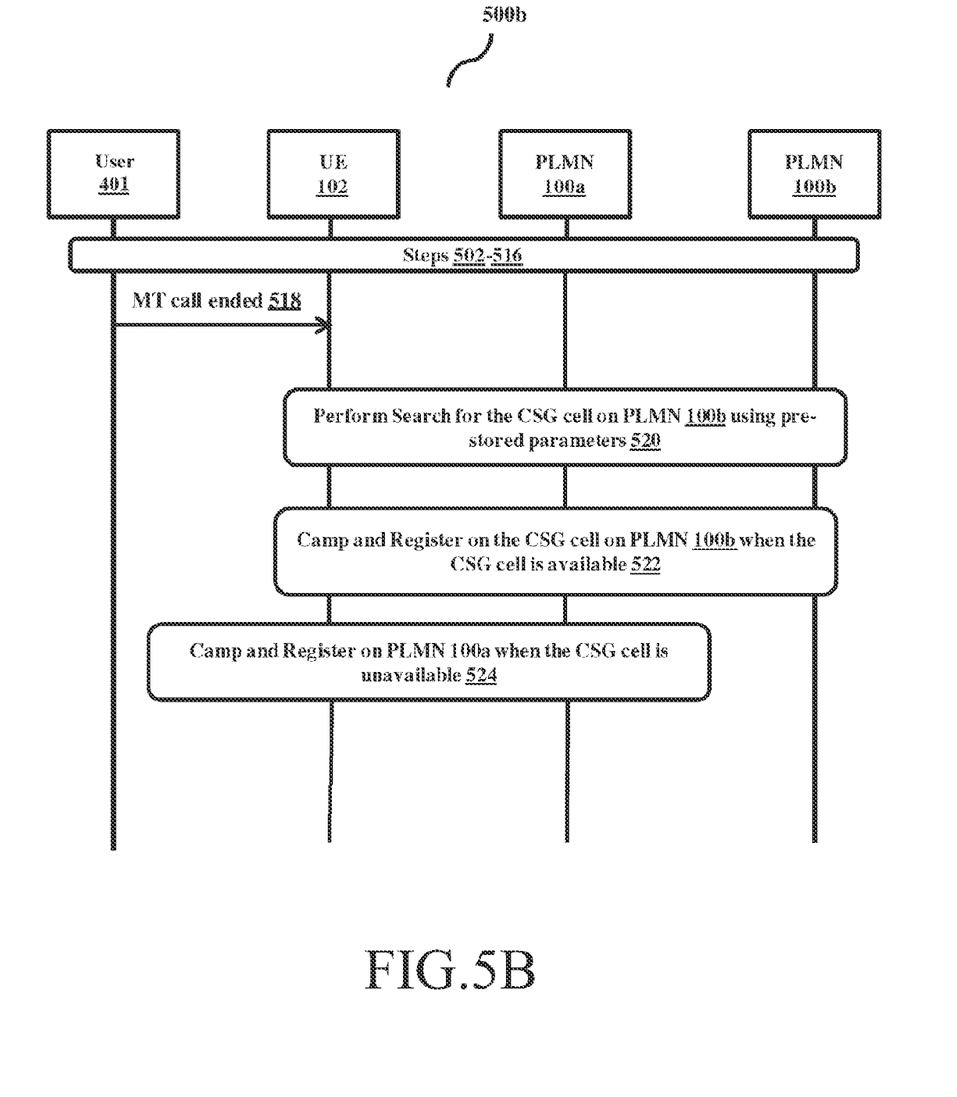
FIG. 5B is a signal flow diagram illustrating message signaling between a UE and PLMNs for camping on and registering with a CSG cell, after processing an MT CS call, according to an embodiment of the present disclosure.

FIG. 5B is a signal flow 500b diagram illustrating message signaling between a UE and PLMNs for camping on and registering with a CSG cell, after processing an MT CS, according to an embodiment of the present disclosure.

Referring to FIG. 5B, the incoming CS call is processed by the UE 102 on a non-CSG cell of the PLMN 100b or a different PLMN through steps 502-516, as illustrated in FIG. 5A.

When an incoming CS call is processed by the UE 102 or the incoming CS call is ended by the user 401 in step 518, the UE 102 initiates a search for the manually selected CSG cell 104*a* on the PLMN 100*b* using the pre-stored parameters in step 520. For example, the pre-stored parameters include the EARFCN, the CSG ID, and the cell ID of the manually selected CSG cell 104*a*.

The UE 102 determines whether the manually selected CSG cell is available as a result of the search with the pre-stored parameters.

If the manually selected CSG cell 104*a* is available, then the UE 102 camps on and registers with the manually selected CSG cell 104*a* of the PLMN 100*b* in step 522. However, if the UE 102 determines that the manually selected CSG cell 104*a* is unavailable as a result of the search, then the UE 102 camps on and registers with the PLMN 100*a* (i.e., the RPLMN) using a stored duplicate value of the PLMN 100*a* in step 524.

The embodiments described herein can be implemented through at least one software program running on at least one hardware device and performing network management functions to control the elements of the embodiments. The elements illustrated in FIGS. 1, 2, 4A, 4B, 5A, and 5B include blocks, which can be at least one of a hardware device, or a combination of hardware device and software module.

Further, the various devices, modules, etc., as described herein, may be embodied as and operated using hardware circuitry, for example, complementary metal oxide semiconductor based logic circuitry, firmware, software and/or any combination of hardware, firmware, and/or software embodied in a machine readable medium.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method of processing a Circuit-Switched (CS) call by a User Equipment (UE), the method comprising:
registering, by the UE, with a manually selected Closed Subscriber Group (CSG) cell of a Public Land Mobile Network (PLMN), which is different from a Registered PLMN (RPLMN) of the UE;
detecting the CS call; and
processing the CS call in a non-CSG cell, when the UE loses coverage of the manually selected CSG cell,
wherein processing the CS call in the non-CSG cell comprises:
sending a request to process the CS call to the manually selected CSG cell;
receiving a redirect request message from the manually selected CSG cell requesting the UE to initiate a Circuit Switched Fall Back (CSFB) procedure in order to select the non-CSG cell; and
initiating the CSFB procedure to select the non-CSG cell for processing the CS call.

2. The method of claim 1, wherein the non-CSG cell supports at least one of a Global System for Mobile communications (GSM) Edge Radio Access Network (GERAN), and a Universal Mobile Telecommunications System (UMTS) Terrestrial Radio Access Network (UTRAN).

3. The method of claim 1, further comprising:
identifying that the CS call is ended; and
camping on and registering with the manually selected CSG cell using a pre-stored parameter associated with the manually selected CSG cell.

4. The method of claim 3, wherein the pre-stored parameter comprises at least one of Evolved UTRA (EUTRA) Absolute Radio Frequency Channel Number (EARFCN) information of the manually selected CSG cell, a CSG Identifier (ID), and a cell ID.

5. The method of claim 3, wherein camping on and registering with the manually selected CSG cell comprises:
initiating a search to identify the manually selected CSG cell;
determining whether the manually selected CSG is available, based on the search; and
camping on and registering with manually selected CSG cell, in response to determining that the manually selected CSG is available.

6. The method of claim 5, further comprising:
camping on and registering with the RPLMN using a stored duplicate value of the RPLMN, in response to determining that the manually selected CSG is unavailable, based on the search.

7. The method of claim 1, wherein the CS call includes one of a Mobile Originated (MO) call and a Mobile Terminated (MT) call.

8. A User Equipment (UE) for processing a Circuit-Switched (CS) call, the UE comprising:
a memory; and
a controller configured to:
register the UE with a manually selected Closed Subscriber Group (CSG) cell of a Public Land Mobile Network (PLMN), which is different from a Registered PLMN (RPLMN) of the UE;
detect the CS call; and
process the CS call in a non-CSG cell, when the UE loses coverage of the manually selected CSG cell,
wherein the controller is configured to process the CS call in the non-CSG cell by:
sending a request to process the CS call to the manually selected CSG cell;
receiving a redirect request message from the manually selected CSG cell requesting the UE to initiate a Circuit Switched Fall Back (CSFB) procedure in order to select the non-CSG cell; and
initiating the CSFB procedure to select the non-CSG cell for processing the CS call.

9. The UE of claim 8, wherein the CS call comprises one of:
a Mobile Originated (MO) call; and
a Mobile Terminated (MT) call.

10. The UE of claim 8, wherein the controller is further configured to:
identify that the CS call is ended; and
camp on and register with the manually selected CSG cell using a pre-stored parameter from the memory, which are associated the manually selected CSG cell.

11. The UE of claim 10, wherein the controller is configured to camp on and register with the manually selected CSG cell by:
initiating a search to identify the manually selected CSG cell;
determining whether the manually selected CSG is available, based on the search; and camp on and register with manually selected CSG cell, in response to determining that the manually selected CSG is available.

12. The UE of claim 10, wherein the controller module is further configured to:
camp on and register with the RPLMN using a stored duplicate value of the RPLMN from the memory, in response to determining that the manually selected CSG is unavailable, based on the search.

13. The UE of claim 10, wherein the pre-stored parameter comprises Evolved UTRA (EUTRA) Absolute Radio Frequency Channel Number (EARFCN) information of the manually selected CSO cell, a CSG IDentifier (ID), and a cell ID.

* * * * *